United States Patent
Chen et al.

(10) Patent No.: US 9,911,396 B2
(45) Date of Patent: Mar. 6, 2018

(54) MULTI-USER INTERACTIVE MEDIA WALL

(71) Applicant: Disney Enterprises, Inc., Burbank, CA (US)

(72) Inventors: Alexander C. Chen, Burbank, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/730,044

(22) Filed: Jun. 3, 2015

(65) Prior Publication Data

US 2016/0232878 A1  Aug. 11, 2016

Related U.S. Application Data

(60) Provisional application No. 62/113,305, filed on Feb. 6, 2015.

(51) Int. Cl.
*G06F 3/14* (2006.01)
*G09G 5/14* (2006.01)
(Continued)

(52) U.S. Cl.
CPC .............. *G09G 5/14* (2013.01); *G06F 1/1605* (2013.01); *G06F 3/011* (2013.01); *G06F 3/147* (2013.01);
(Continued)

(58) Field of Classification Search
CPC ... G09G 5/14; G09G 5/30; G09G 5/32; G06F 1/1605; G06F 1/1609; G06F 3/01; G06F 3/011; G06F 3/14; G06F 3/1446; G06F 3/1431; G06F 3/1438; G06F 15/16; G06F 3/147; G06F 3/167; H04N 7/08; H04N 7/0806; H04N 21/41415; H04N 21/4307; H04N 21/4532; H04W 4/00; H04W 4/008; H04L 29/08; H04L 67/10; H04L 67/18; H04L 65/60; G06Q 30/0255;
(Continued)

(56) References Cited

U.S. PATENT DOCUMENTS 6,408,278 B1  6/2002  Carney et al.
6,680,714 B2  1/2004  Wilmore
(Continued)

OTHER PUBLICATIONS

Buerger, Neal, Types of Public Interactive Display Technologies and How to Motivate Users to Interact, http://nealbuerger.com/wp-content/uploads/2011/07/Neal_Buerger_Types-of-Public-Interactive-Display-Technology.pdf, accessed on Oct. 27, 2015, pp. 1-7.
(Continued)

*Primary Examiner* — Jennifer Mehmood
*Assistant Examiner* — Sardis F Azongha
(74) *Attorney, Agent, or Firm* — Sheppard Mullin Richter & Hampton LLP

(57) ABSTRACT

An interactive media wall is provided on which multiple media contents can be simultaneously displayed. Multiple users can interact with the interactive media wall such that visual portions of the multiple media contents can be presented on the interactive media wall, while audio portions of the media contents may be presented to each of the multiple users via peripheral listening devices. Users consuming the same media content can communicate via a chat session(s).

20 Claims, 5 Drawing Sheets

(51) Int. Cl.
*G09G 5/30* (2006.01)
*G09G 5/32* (2006.01)
*G06F 1/16* (2006.01)
*G06F 3/01* (2006.01)
*G06F 3/16* (2006.01)
*G06F 3/147* (2006.01)

(52) U.S. Cl.
CPC ............... *G06F 3/167* (2013.01); *G09G 5/32* (2013.01); *G09G 2354/00* (2013.01); *G09G 2370/022* (2013.01); *G09G 2370/04* (2013.01); *G09G 2370/06* (2013.01)

(58) Field of Classification Search
CPC ........... G06Q 30/0256; G06Q 30/0257; G06Q 30/0261; G06Q 30/00; G06Q 30/0241; G06Q 30/0269; G06Q 30/0271
See application file for complete search history.

(56) References Cited

U.S. PATENT DOCUMENTS

| | | | |
|---|---|---|---|
| 7,778,842 B2 | 8/2010 | Apple et al. | |
| 8,495,236 B1 | 7/2013 | Glasser | |
| 8,505,054 B1 | 8/2013 | Kirley | |
| 8,543,455 B2 | 9/2013 | Damera-Venkata et al. | |
| 8,704,777 B2* | 4/2014 | Small | H04N 1/00127 345/1.3 |
| 8,756,333 B2* | 6/2014 | Jannink | G06F 17/30017 709/203 |
| 9,232,115 B2* | 1/2016 | Oh | H04N 5/04 |
| 9,392,335 B2* | 7/2016 | Broome | G06Q 50/01 |
| 2003/0043190 A1* | 3/2003 | Bernius | H04L 12/1827 715/753 |
| 2006/0028398 A1 | 2/2006 | Willmore | |
| 2008/0052746 A1 | 2/2008 | Cooper et al. | |
| 2008/0120501 A1* | 5/2008 | Jannink | G06F 17/30017 713/163 |
| 2009/0319625 A1 | 12/2009 | Kouhi | |
| 2012/0095749 A1 | 4/2012 | Capretta | |
| 2012/0233631 A1* | 9/2012 | Geshwind | H04N 21/2547 725/1 |
| 2013/0204930 A1* | 8/2013 | Hobby | H04L 65/60 709/203 |
| 2014/0100955 A1* | 4/2014 | Osotio | G06F 3/011 705/14.55 |
| 2014/0168277 A1* | 6/2014 | Ashley | G06F 3/1446 345/672 |
| 2015/0067187 A1* | 3/2015 | Glasser | H04L 65/60 709/231 |
| 2015/0146879 A1* | 5/2015 | Nguyen | H04R 1/1041 381/74 |
| 2015/0220300 A1 | 8/2015 | Reynaga et al. | |
| 2016/0091968 A1* | 3/2016 | Angelo | G06F 3/013 345/156 |
| 2016/0182613 A1* | 6/2016 | Brune | H04L 67/10 709/217 |

OTHER PUBLICATIONS

Anzures, H. et al., Multi-user interaction with public screens using mobile devices, Electrical Engineering Computing Science and Automatic Control (CCE), 2011 8th International Conference on, Oct. 28, 2011, pp. 1-5, IEEE.

Seager, W et al., "It's going to be havoc": Shared control of a TV display, http://infoscience.epfl.ch/record/173180/files/Shareable%20Interfaces%20Workshop_WSeager&HKnoche.pdf, accessed on 10/27/215, pp. 1-2.

* cited by examiner

Determine whether a first user is proximate to the interactive media wall and desires to interact with the interactive media wall
400

Upon a determination that the first user desires to interact with the interactive media wall, display a visual portion of a first media content on the interactive media wall
402

Determine whether a second user is proximate to the interactive media wall and desires to interact with the interactive media wall
404

Upon a determination that the second user desires to interact with the interactive media wall, display a visual portion of a second media content on the interactive media wall simultaneously with the visual portion of the first media content
406

FIG. 4

MULTI-USER INTERACTIVE MEDIA WALL

CROSS-REFERENCE TO RELATED APPLICATIONS

This application claims the benefit of U.S. Provisional Patent Application Ser. No. 62/113,305, filed Feb. 6, 2015, which is incorporated herein by reference in its entirety.

TECHNICAL FIELD

The present disclosure relates generally to the display of media content.

DESCRIPTION OF THE RELATED ART

Media displays (and corresponding media display technologies), such as televisions, projectors, monitors, and the like have been placed in a variety of settings. Such settings may include, but are not limited to eating and drinking establishments, amusement parks, shopping centers, etc.

BRIEF SUMMARY OF THE DISCLOSURE

In accordance with one embodiment, a computer-implemented method for displaying media contents on an interactive media wall, comprises determining whether a first user is proximate to the interactive media wall and desires to interact with the interactive media wall. The computer-implemented method further comprises displaying a visual portion of a first media content on the interactive media wall upon a determination that the first user desires to interact with the interactive media wall. Additionally, the computer-implemented method comprises determining whether a second user is proximate to the interactive media wall and desires to interact with the interactive media wall, and upon a determination that the second user desires to interact with the interactive media wall, displaying a visual portion of a second media content on the interactive media wall simultaneously with the visual portion of the first media content.

In accordance with another embodiment, an interactive media wall comprises at least one display area configured to simultaneously display visual portions of multiple media contents associated with multiple users. The interactive media wall further comprises multiple portals within which the multiple media contents are simultaneously displayed. Further still, the interactive media wall comprises identification areas proximate to the multiple portals through which the multiple users are identified as viewing their respective visual portions of the multiple media contents.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 is an operational flow diagram illustrating an example process for displaying multiple media content on an interactive media wall in accordance with various embodiments

The figures are not exhaustive and do not limit the present disclosure to the precise form disclosed.

DETAILED DESCRIPTION

Media displays can be configured to display a variety of media content types, including advertisements, audio/visual content, still images, etc. Conventional media displays are usually limited to displaying "singular" instances of media at any one time and allow limited interaction because they are controlled by a single user at any one time, such as in the case of picture-in-picture capable media displays.

Accordingly, various embodiments described in the present disclosure provide a large-format display, such as a media wall, that displays multiple media contents simultaneously for multiple users to watch. One person can watch a comedy, while another person watches a ball game, while another person watches an action movie. Additionally, the media wall allows various types of user interaction in conjunction with the display of multiple media contents. Media content in the present disclosure can be any type of media content, including but not limited to movies, broadcast TV shows, online videos, user-created videos, music, images, video games, and the like. Moreover, the media content can be accessed or originate from one or more broadcast entities, media content servers, personal devices, etc.

Figure 1:
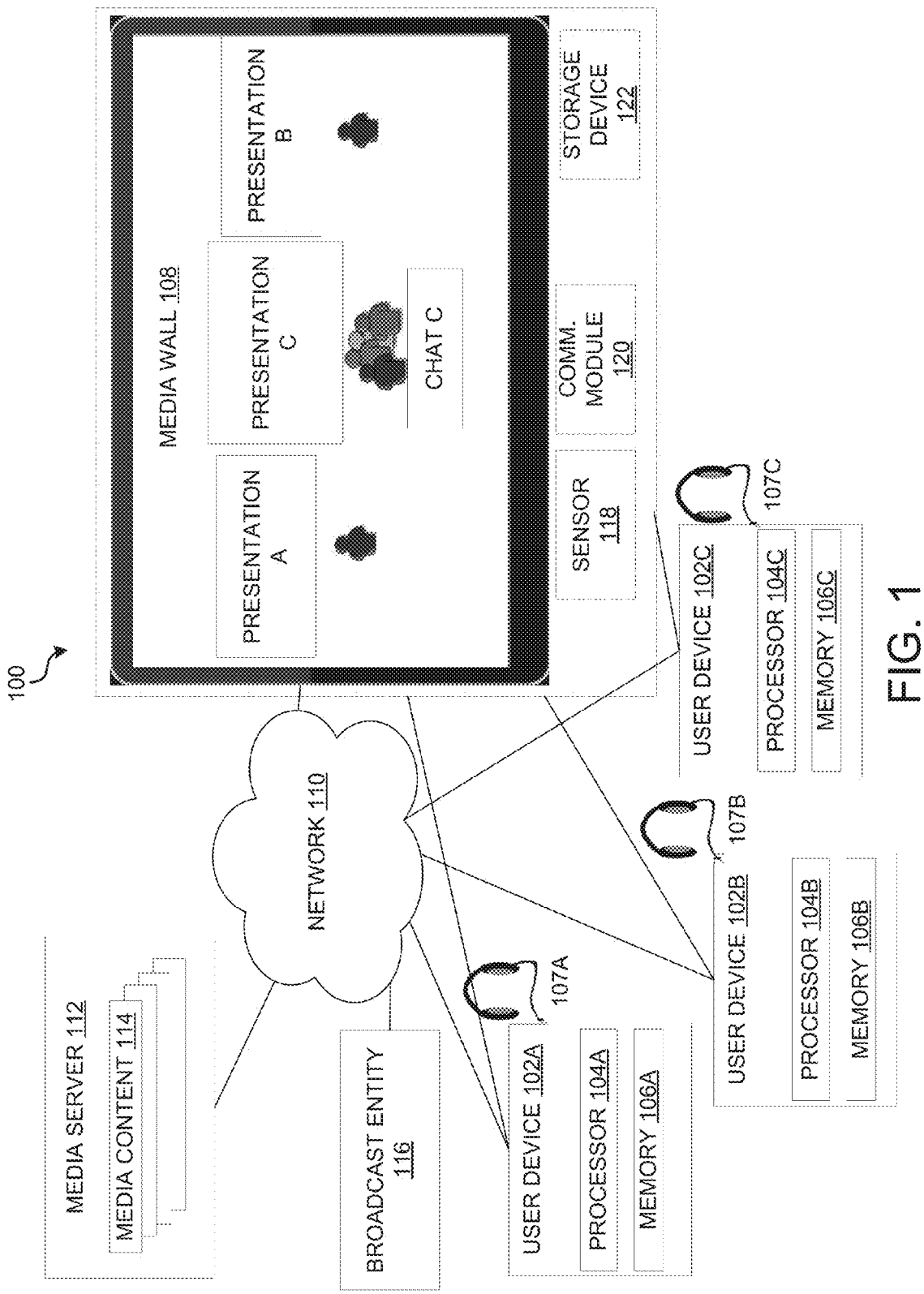
FIG. 1 illustrates an example environment in which various embodiments may be implemented.

FIG. 1 is a diagram illustrating an example environment in which various embodiments can be implemented. FIG. 1 illustrates a system 100 for providing media content on an interactive media wall 108. As illustrated in FIG. 1, system 100 can include one or more user devices 102A, 102B, 102C. Each of user devices 102A, 102B, and 102C may include its own respective processor 104A, 104B, 104C and respective memory unit 106A, 106B, 106C. User devices 102A, 102B, and 102C may be configured to access media content stored on or provided via its respective memory unit, a content or media server 112, a broadcast entity 116, whether locally or physically stored, or via cloud or network storage. User devices 102A, 102B, and 102C may be a tablet PC, a smart phone, a laptop PC, some alternative form of media accessing or presentation device, etc.

The memory units 106A-106C may store user information, such as identification information and/or user preferences, such as favorite sports teams, movies, types of movies, video games, etc. The user devices 102A-102C may transmit the user information to the media wall 108.

As will be described in greater detail below, in some embodiments, one or more of user devices 102A, 102B, or 102C may be a wearable identification device, such as a watch, an ID band with a code associated with a user, etc. In accordance with some embodiments, one or more of user devices 102A, 102B, or 102C may belong to a user, i.e., the user's personal device, or may be provided by some entity, such as a business establishment at which an interactive media wall is located. Moreover, in still other embodiments, a user need not utilize a user device to select and/or view media content on an interactive media wall. Rather, the interactive media wall 108 may comprise one or more touchscreens and/or sensors, such as biometric sensors 118 capable of recognizing a user and displaying media content relevant to or associated with that particular user. A user may walk up to media wall 108 and touch a touchscreen to control mediate content, such as select a media content from a menu of media contents, change a media content, pause, fastforward, rewind, adjust the size of a portal, etc. It should be noted that although three user devices (associated with three users) are illustrated, more or less user devices may be present, while an interactive media wall 108 in accordance with various embodiments can present multiple media contents.

Further still, each of user devices 102A, 102B, and 102C may have an associated peripheral audio or hearing device. For example, each of user devices 102A, 102B, and 102C may be utilized with headsets, ear phones, ear buds, or headphones 107A, 107B, and 107C, respectively. In this way, and as will be discussed in greater detail below, multiple users may view multiple visual media content on media wall 108 simultaneously and listen to audio associated with their respective media content on his/her respective headphones 107 without disturbing other users. In accordance with other embodiments, directional speakers may be utilized to direct sound or audio to an appropriate user or in an appropriate direction to achieve a similar result.

As alluded to previously, system 100 may further include a media server 112, which may be operated by a content provider, such as a movie studio, a TV studio, a cable provider (e.g., COMCAST®), YouTube®, a digital media content distributor, such as Amazon®, iTunes®, Netflix®, or other third-party distributor. Media server 112 may include a content database on which digital media content 114 can be stored. Media server 112 may further include a search engine for performing searches of media content or portions of media content based on the user's voice commands or input. Further still, system 100 may include a broadcast entity 116 that broadcasts TV shows, on-demand media, etc.

Communications between one or more of media server 112, broadcast entity 116, and/or user devices 102A, 102B, and 102C can be effectuated over a network 110. Network 110 may be any cable, wire, and/or wireless communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 110 may employ various communication media, such as a coaxial cable, fiber optic cable system, Ethernet, radio waves, etc.

Media wall 108 may be any media display device(s) utilizing any media display technology(gies). For example, media wall 108 may be a large-format light emitting diode (LED), organic LED (OLED), liquid crystal display (LCD), or plasma monitor. Media wall 108 may also be effectuated through the use of a projection system, where media content can be projected onto an appropriate surface, such as a wall, curtain, floor, etc. It should be noted that although a single media wall 108 is illustrated, multiple media walls can be utilized in accordance with various embodiments. The media wall 108 itself may be some combination of a plurality of displays, panels or resulting displays (e.g., from multiple projection systems). In the case of multiple displays making up media wall 108, the multiple displays may operate in conjunction with each other. Moreover, and as will be discussed below, media wall 108 may have elements such as sensors, and in the case of multiple displays, these sensors may operate independently or also in conjunction with each other.

Media wall 108 may have various capabilities, such as a touchscreen, a motion sensor, or a voice recognition unit. The media wall 108 can display and interact with multiple media contents and/or user devices. It should also be noted that media wall 108 need not conform to a standard display format, such as 16:9. Rather, media wall 108 may have multiple presentation formats or "surfaces." For example, media wall 108 may be dual-sided, cuboid, triangularly-shaped, etc. Media wall 108 may also be spherical, curved, flexible, or embody other shapes.

Media wall 108 may also be operatively connected to network 110 via communication modules 120, as the other elements of system 100 described above, and may have access to any media stored or otherwise accessible on or provided by those other elements. The communication modules 120 may allow the media wall 108 to communicate with the user devices 102A-102C.

Media wall 108 may further comprise one or more sensors 118, such as an array of sensors. Sensor 118 may be a biometric sensor (e.g., retina scan, fingerprint recognition, face recognition, etc.), as alluded to above, and/or may be a positional sensor (e.g., object sensor, motion sensor). That is, sensor 118 may determine an identity of a user, such that a user may place his/her hand on media wall 108, so that media wall 108 can identify the user. Upon identifying the user, media wall 108 may access a user profile associated with the identified user to initiate presentation of one or more media content associated with the user.

Media wall 108 may also use positional sensors to determine media display preferences. For example, sensor 118 may sense that a user is located proximate to a certain side of media wall 108 so as to display media content commensurate with the location of the user. As described above, media wall 108 may be spherical in shape, capable of presenting media content in 360 degrees. Therefore, determining the appropriate location on media wall 108 to display media content is desirable. Additionally still, sensor 118 may be used to sense the relative size of a user proximate to media wall 108. For example, if a child approaches media wall 108, sensor 118 may determine that given the "size" of the user (in this case, a child), appropriate media content, such as a children's show is to be displayed, e.g., on a lower region of the wall 108. In contrast, if a taller user approaches media wall 108, sensor 118 may ascertain that this taller user is an adult and may initiate presentation of an adult program, such as a news program or the like, for example, on a higher region of the wall 108. In these scenarios, user devices, such as user devices 102A, 102B, and 102C need not be utilized. In other scenarios, it is possible that the aforementioned functionality of media wall 108 can operate in conjunction with or provide additional functionality for user devices 102A, 102B, and/or 102C.

In operation, a user, e.g., a user of user device 102A may approach media wall 108. The user may be sensed by sensor 118, or user device 102A may be sensed by media wall 108, e.g., via communications module 120 using near-field communications (NFC), such as WiFi, Bluetooth, or other NFC mechanism, where user device 102A can become linked with, sync'ed to, or otherwise associated with media wall 108. The user of user device 102A may select media content to be displayed on media wall 108, such as a TV show, movie, etc. that is stored locally on user device 102A, stored locally on a storage device 122 (hard drive or disc) on or near the media wall 108, or accessed from media server 112 or broadcast entity 116 through the network 110 either by user device 102A or media wall 108. For example, the user of user device 102A may access a movie from media server 112 via a media application resident on user device 102A. That media application may ask the user if he/she wishes to display the video portion of the movie on media wall 108. If the user does, media wall 108 can commence with presenting the video portion of the movie on media wall 108. The user may listen to the audio portion of the movie from a speaker on or next to the media wall 108 or via headphones 107A attached to the user device 102A.

It should be noted that in the case of movies or other media content that may have associated digital rights management (DRM), advertisements or commercials may be played when displayed on media wall 108. For example, and as will be discussed in greater detail below, a user may be watching a movie on his/her user device, where he/she may have purchased rights to view an ad-free version of the media content. However, upon a decision to present the media content on media wall 108 (e.g., if the user moves proximate to media wall 108), an alternative ad-supported version of the media content may be displayed, as the media content will now be presented to potentially a non-paying audience.

Additional users, e.g., users of user devices 102B and 102C may, in the same or similar manner, have their desired media content (movie, TV show, or video game) displayed on media wall 108, while they listen to the audio portions of their respective media content on headphones 107B and 107C. Accordingly, media wall 108 may simultaneously present media content, i.e., presentation A (media content of user device 102A), presentation B (media content of user device 102B), and presentation C (media content of user device 102C). In this way, multiple users may view the visual aspect(s) of their desired media content played simultaneously via media wall 108 without having the respective audio/sound disturbing each other and other persons in the vicinity of media wall 108.

If the media wall 108 is located in a place (movie theater, restaurant, airport, mall) where children and adults may be present, the media wall 108, media server 112, and/or broadcast entity 116 may filter the media content or provide a version that is appropriate for all ages. For example, certain scenes of a movie may be deleted, and explicit language may be deleted. In another embodiment, some content selected by a user may be blocked by the media wall 108 from being displayed.

In addition, users viewing media content on media wall 108 may choose to display an icon, avatar, photo, or other user-identifying information (stored on user devices 012A-102C) on the media wall 108 next to their respective media presentation. For example, users may have an icon of their favorite sports team(s) shown next to a ball game on the media wall 108, so people can see how many fans of each team are watching a specific game on the media wall 108. The media wall 108 can show icons of two different sports teams interacting (e.g., playing sports) with each other.

In accordance with some embodiments, users may be able to vote for or rate media content being presented on media wall 108. That vote or rating of media content may be hidden or displayed to viewers of media wall 108. A gaming aspect can be embodied in accordance with various embodiments utilizing such a rating system. Moreover, media wall 108 may monitor ratings of media content being viewed thereon, or simply, the number of viewers watching the media content. The media wall 108 may increase the size of a presentation, such as presentation C, if more users are watching it or voting for it. Such monitored ratings or aggregated statistical information can at some point be uploaded to the server or entity from which the media content is obtained, providing information regarding media wall 108 viewership. This can be later utilized by the media server or entity in any one of a number of statistical-based actions, such increased advertising or targeted advertising for a TV show determined to have "good" ratings or high viewership on media wall 108.

Additionally still, users viewing media content on media wall 108 may communicate with each other (or other remotely located viewers, e.g., in the case of broadcast media) via a chat. For example, media wall 108 may have multiple viewers watching presentation C. Those multiple viewers may communicate via a chat session. The conversation may be displayed on media wall 108 or on user devices 102A-102C. For example, the most recent, e.g., five lines of communications, may be displayed on media wall 108, whereas an associated media or chat application resident on the users' user devices may present all the chat communications in standard format. The chat on user devices can be scrolled up or down. Users may also engage in "whisper" communications should certain users wish to communicate in private with each other, so that their communication(s) is not displayed on media wall 108.

It should be noted that the various presentations can be viewed on "portals" on media wall 108. These portals can vary in size and location. For example, the size and/or positioning of presentation C may be larger compared to presentations A and B due to more users viewing presentation C. Additionally or alternatively, the portal in which presentation C is displayed may be positioned in a certain area, e.g., centrally, due to the greater number of users viewing presentation C compared to the portals in which presentations A and B are presented. Alternatively still, the one or more users viewing media content on media wall 108 can be polled or they can initiate, via chat, or another mechanism, moving the location of a portal on media wall 108. Further still, media wall 108 may determine, e.g., via metadata associated with media content or an initiating user, where to locate a portal in which media content is to be displayed. For example, upon identifying a user or a media content as being a children's show, movie, etc., media wall 108 can present the portal along a lower area thereon so that children can sit on the ground relative to media wall 108 and watch the show.

In the case of presenting photos or still images on media wall 108, a default time limit or a user-selected time limit can be used to limit the amount of time a photo may be displayed. For example, media wall 108 may be utilized in an amusement park for, at least in part, to display photos of park visitors after a park ride. A user may approach media wall 108 and the associated photo may be displayed on media wall 108 for some predetermined amount of time in order to allow the user to determine whether he/she would like to purchase the photo. In this case, biometric sensing may be used to identify the user via face recognition methods.

It should be noted that prior to presenting user media content on media wall 108, default media can be stored on storage device 122 (hard drive or disc) and presented. For example, if media wall 108 is located within a retail location such as a restaurant, the restaurant may display default advertising videos, images, or background wallpaper on media wall 108. In this instance, media wall 108 may output audio as well, or may still require users to connect a user device to media wall 108 to hear associated audio or sound, even if those users are merely watching the default media content. Alternatively, a "first" user to utilize media wall 108 may set some background media content to be displayed.

In one example, a first user can initiate a video game on a first user device 102A. When the first user walks towards the media wall 108, and the first user device 102A comes within a certain range (e.g., 20 feet) of the media wall 108, the media wall 108 can display the video game. This can occur automatically (without user intervention) or require the user to establish a link between the user device 102A and the media wall 108. A second user may use a second user device 102B to join the game played by the first user and displayed on the media wall 108. If the first user leaves the area, the game may end, or the second user may continue the game with the second user device 102B and the media wall 108.

In another example, a first user can use the first user device 102A to initiate a video game on the media wall 108. A second user may use a second user device 102B to join the game played by the first user and displayed on the media wall 108.

Figure 2:
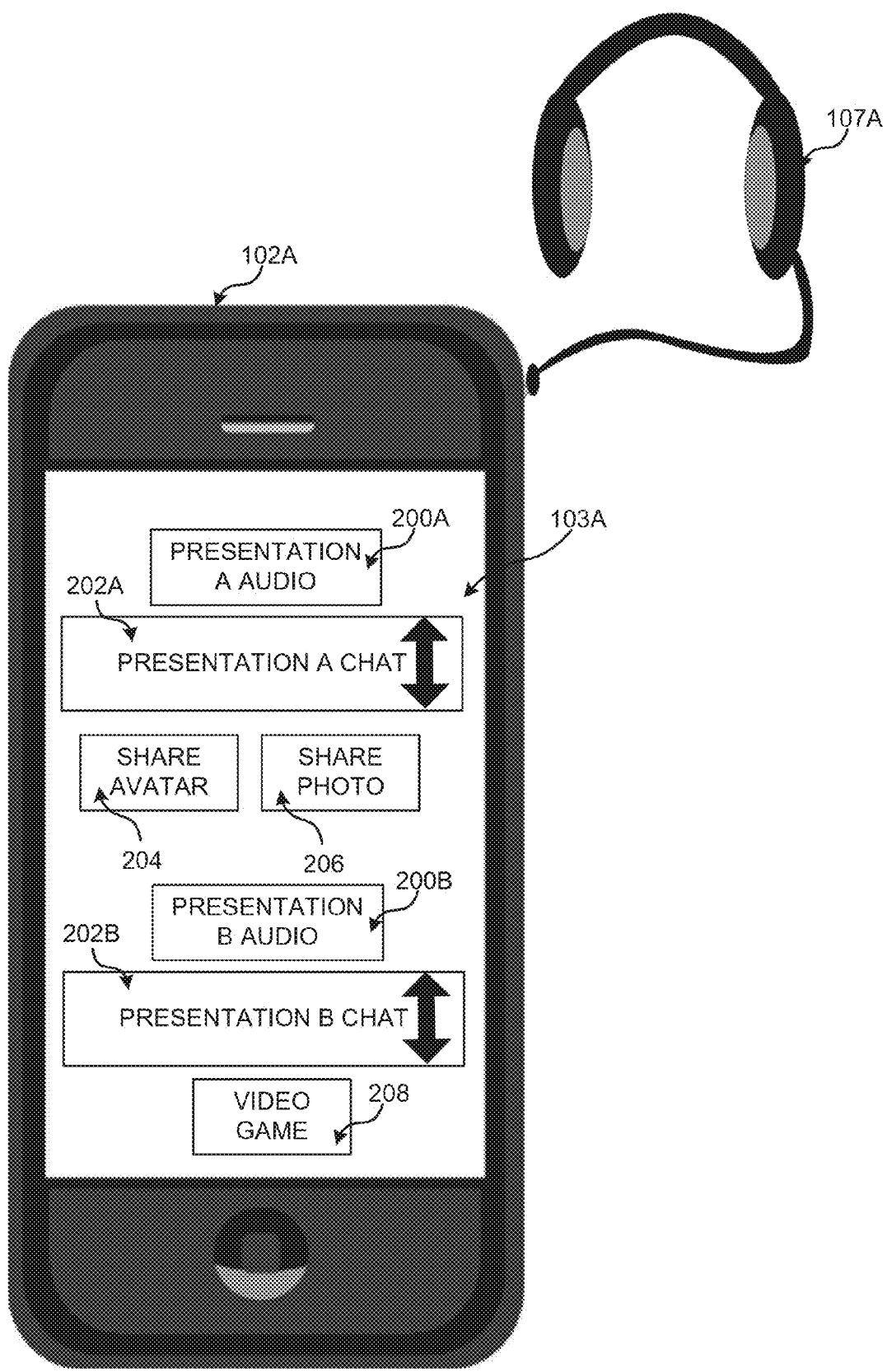
FIG. 2 illustrates an example user interface for interacting with an interactive media wall in accordance with various embodiments.

FIG. 2 illustrates an example user interface 103A on a user device 102A in accordance with various embodiments. As indicated previously, user devices, such as user device 102A, may connect and interact with the interactive media wall 108 of FIG. 1. To achieve this interaction, user device 102A may present a user interface 103A to allow the user to control one or more aspects of media content on media wall 108 and interact with other users watching the media wall 108. For example, user interface 103A may present options for listening to audio content 200A associated with presentation A, audio content 200B for presentation B, etc. through headphones or other peripheral listening device 107A. Users may have the option to listen to media content presented on media wall 108 in different languages. The user interface 103A may present a chat option 202A, 202B for a user to chat with other users. The user interface 103A may present an option 204 to display an avatar, and an option 206 to display a photo, etc. on media wall 108 next to a media presentation that the user is watching. The user interface 103A also shows an option 208 to initiate a video game on the media wall 108.

Certain embodiments described thus far have involved communications between media wall 108 and one or more user devices, e.g., user devices 102A, 102B, and/or 102C to effectuate media content presentation and consumption. In accordance with other embodiments, presenting media on an interactive media wall, such as media wall 108 of FIG. 1, can be achieved without necessarily making a direct connection(s) to or engaging in communications between a user device and media wall 108. That is, the presentation of media content and other interactions and/or control can be achieved primarily over a network, such as network 110. For example, geolocation or location-based methods can be used to determine if a user device is located proximate to an interactive media wall. If so, a user, via the network, can initiate presentation of media content on that interactive media wall by instructing, e.g., a media server, to display media content on that interactive media wall, thereby avoiding any need for instructions to be sent to the interactive media wall directly.

Figure 3:
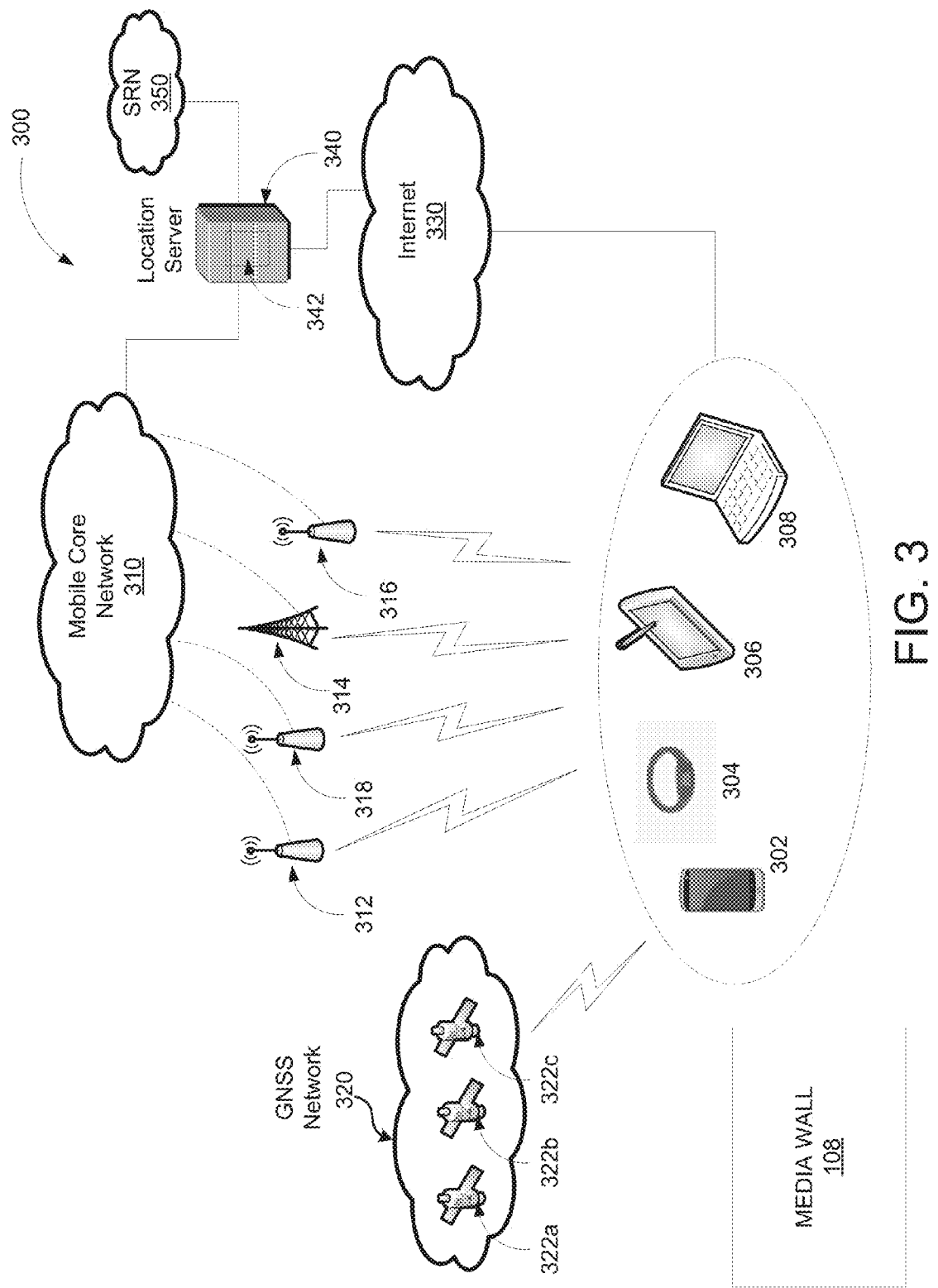
FIG. 3 illustrates an example communications system with which various embodiments may be implemented.

FIG. 3 is a block diagram illustrating an example communication system 300 in which various embodiments may be implemented in accordance with the present disclosure. Communications system 300 may include a plurality of mobile devices, of which mobile devices 302-308 (one or more of which may be example embodiments of user devices 102A, 102B, and 102C of FIG. 1) are illustrated. Example mobile devices may include a smart phone 302, an identification device, such as an NFC ID band 304, a tablet PC 306, and/or a laptop PC 308. Also shown in communication system 300 is a mobile core network 310, a wireless access point (AP) 312, a cellular base station (BS) 314, a Bluetooth® emitter 316, an NFC terminal 318, a global navigation satellite system (GNSS) network 320, a plurality of GNSS satellites 322a-322n, an internet 330, a location server 340, and a satellite reference network (SRN) 350. One or more of mobile core network 310, wireless AP 312, cellular BS 314, Bluetooth® emitter 316, NFC terminal 318, GNSS network 320, GNSS satellites 322a-322n, internet 330, location server 340, and/or satellite reference network (SRN) 350 can be used in assisting to determine the location of one or more of the mobile devices 302-308 and/or for determining the location of an interactive media wall, such as media wall 108.

Wireless AP 312 may include suitable logic, circuitry, interfaces, and/or code that are operable to provide data services to communication devices, such as one or more of the mobile devices 302-308, in adherence with one or more wireless LAN (WLAN) standards such as, for example, IEEE 802.11, 802.11a, 802.11b, 802.11d, 802.11e, 802.11n, 802.11 ac, 802.11v, and/or 802.11u. Wireless AP 312 may communicate with mobile core network 310 and/or internet 330, via one or more links and/or associated devices for example. In this manner, wireless AP 312 may provide network access to mobile devices 302-308.

Cellular BS 314 may include suitable logic, circuitry, interfaces, and/or code that are operable to provide voice and/or data services to communication devices, such as one or more of the mobile devices 302-308, in adherence with one or more cellular communication standards. Exemplary cellular communication standards may include Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). Cellular BS 314 may communicate with mobile core network 310 and/or internet 330, via one or more backhaul links and/or associated devices for example. In this manner, cellular BS 314 may provide network access to mobile devices 302-308, enabling a mobile device, such as smart phone 302, to communicate with one or more databases, services, servers, networks, or interactive media walls as described herein.

Bluetooth® emitter 316 may include suitable logic, circuitry, interfaces, and/or code that are operable to provide Bluetooth® based connectivity to communication devices, such as one or more of mobile devices 302-308, in adherence with various Bluetooth® and/or Bluetooth® Low Energy (BLE) standards. Bluetooth® emitter 316 may communicate with mobile core network 310 and/or internet 330, via one or more backhaul links and/or associated devices for example. In this manner, Bluetooth® emitter 316 may provide network access to mobile devices 302-308, enabling a mobile device, such as smart phone 302 to communicate with one or more entities of system 300.

NFC terminal 318 may include suitable logic, circuitry, interfaces, and/or code that can provide NFC-based connectivity to communication devices, such as one or more of the mobile devices 302-308, in adherence with various short range communication standards such as the Near Field Communications standards. The NFC terminal 318 may communicate with the mobile core network 310 and/or the internet 330, via one or more backhaul links and/or associated devices for example. In this manner, the NFC terminal 318 may provide network access to the mobile devices 302-308. One example implementation of an NFC terminal 318 is for use in presenting media content on an interactive media wall, such as media wall 108.

Mobile core network 310 may include suitable logic, circuitry, interfaces, and/or code that are operable to provide interfacing and/or connectivity servicing between access networks, which may be utilized by the mobile devices 302-308, and external data networks such as packet data networks (PDNs) and/or internet 330. Mobile core network 310 may correspond to one or more service providers that provide, control, and/or manage network accessibility available via mobile devices 302-308. In this regard, mobile devices 302-308 may access the mobile core network 310 via wireless AP 312, cellular BS 314, Bluetooth® emitter 316, and/or NFC terminal 318. Mobile core network 310 may communicate various data services, which are provided by external data networks, to associated user devices such as, for example, mobile devices 302-308. In an example aspect of the disclosure, mobile core network 310 may be operable to communicate with location server 340 to obtain location information that can be used to ascertain a location of an interactive media wall, e.g., media wall 108 and/or smart phone 302 to achieve the presentation of media content on media wall 108 as described previously.

Each of mobile devices 302-308 may include suitable logic, circuitry, interfaces, and/or code for implementing various aspects of the embodiments disclosed herein. In this regard, each of mobile devices 302-308 may be operable to communicate via a plurality of wired and/or wireless connections. Each of mobile devices 302-308 may be operable, for example, to transmit to and/or receive signals from one or more of wireless AP 312, cellular BS 314, Bluetooth® emitter 316, NFC terminal 318, GNSS network 320, and/or internet 330. Also, each of mobile devices 302-308 may be operable to communicate with, and/or receive services provided by internet 330 and/or mobile core network 310. In this regard, mobile devices 302-308 may be operable to effectuate the presentation of media content on an interactive media wall, which can utilize location server 340.

GNSS network 320 may include suitable logic, circuitry, interfaces, and/or code that may provide navigation information to land-based devices via satellite links. In this regard, GNSS network 320 may include, for example, a plurality of GNSS satellites 322a-322n, each of which is operable to provide satellite transmissions based on a GNSS. Exemplary GNSS systems may include, for example, GPS, GLONASS, Galileo-based satellite system, Beidou and/or Compass systems. Accordingly, GNSS network 320 may be operable to provide positioning information via downlink satellite links transmitted from one or more of the plurality of GNSS satellites 322a-322n to enable land-based devices, such as the mobile devices 302-308, to determine their locations. The plurality of GNSS satellites 322a-322n may directly provide positioning information and/or a land-based device may utilize satellite transmissions from different satellites to determine its location using, for example, triangulation based techniques.

SRN 350 may include suitable logic, circuitry, interfaces, and/or code that are operable to collect and/or distribute data for GNSS satellites on a continuous basis. SRN 350 may include a plurality of GNSS reference tracking stations located around the world to provide A-GNSS coverage all the time in both a home network and/or any visited network. In this regard, SRN 350 may utilize satellite signals received from various GNSS constellations, such as, for example, the plurality of GNSS satellites 322a-322n of GNSS network 320.

Location server 340 may include suitable logic, circuitry, interfaces, and/or code that are operable to provide and/or support location based services. In this regard, location server 340 may be operable to store and/or process location related information pertaining to communication devices in system 300, such as one or more of mobile devices 302-308, as well as the location of other entities, such as points of interest, merchants, etc. It should be noted that location server 340 may access and/or communicate with other location servers/services (not shown) for the purpose of associating a location of communication devices in system 300 with known locations of other entities, points of interest, etc. The location information may be stored in a location reference database 342 in location server 340. Location server 340 may be operable to collect and/or retrieve location information from communication devices. Location server 340 may also be operable to access additional and/or dedicated entities, such as SRN 350 for example, to collect GNSS satellite data, and may be operable to utilize the collected GNSS satellite data to generate GNSS assistance data (A-GNSS data) including, for example, ephemeris data, long term orbit (LTO) data, reference positions and/or time information. Location server 340 may communicate the stored location data when requested to do so.

In operation, location server 340 may be utilized to provide LBS in system 300. Location server 340 may maintain, for example, location reference database 342, which may include elements corresponding to each of mobile devices 302-308. Location server 340 may access SRN 350 to collect GNSS satellite data, and may utilize the collected GNSS satellite data to generate GNSS assistance data (A-GNSS data) pertaining to the mobile devices 302-308. Location server 340 may also collect and/or retrieve location information directly from mobile devices 302-308, and/or from other associated entities that interact with mobile devices 302-308 in system 300, such as, for example, wireless AP 312, cellular BS 314, Bluetooth® emitter 316, and/or NFC terminal 318. The retrieved location information may be stored in location reference database 342 in location server 340. Location server 340 may communicate the stored location data, e.g., when requested to do so. Location reference database 342, maintained in location server 340, may be modified, refined, and/or updated using retrieved location information. Location information stored and/or maintained by location server 340 may be utilized to augment and/or substitute for location information received and/or generated based on communication with GNSS network 320, for example, when communication with GNSS network 320 is disturbed.

The location data may also be locally generated, and/or maintained thereafter by devices and/or entities other than location server 340. In this regard, location related data, which typically may be generated and/or maintained by location server 340, may be locally generated, maintained, and/or used by mobile devices 302-308, and/or by service providers thereof. Accordingly, devices and/or entities that typically may be serviced by location server 340, such as mobile devices 302-308, may also perform location related servicing locally. Furthermore, locally generated and/or maintained location related data may be uploaded from mobile devices 302-308, and/or service providers thereof, to location server 340. Uploading the location related data may be performed periodically, on request, and/or based on the configuration of the client devices or entities, and/or location server 340 itself.

The location information stored and/or maintained in location server 340 may be utilized to authenticate, for example, one or more of mobile devices 302-308, users thereof, and/or locations thereof during operations performed by mobile devices 302-308. In this regard, service providers, who may provide access servicing to mobile devices 302-308, may contact location server 340 to request that location server 340 perform authentication procedures, and/or to obtain information necessary for performing the authentication procedures. The service providers may include, for example, cellular, Bluetooth®, WLAN, and/or NFC services providers. For example, a service provider of one of mobile devices 302-308 may request authenticating the mobile device, its user, and location at a given instance. Location server 340 may then perform the necessary authentication procedures, which may be based on existing information in location reference database 342, which is maintained by location server 340. Location server 340 may also perform authentication procedures based on current information, which may be obtained by, for example, communicating with the mobile device, to verify its present location and/or connectivity status or parameters. In this regard, location server 340 may communicate with the mobile device using IP packets that may be communicated via internet 330, which may be transmitted to and/or received by the mobile device via its internet connectivity, and/or via its network access via wireless AP 312, cellular BS 314, Bluetooth® emitter 316, and/or NFC terminal 318.

Internet 330 may include a system of interconnected networks and/or devices that enable exchange of information and/or data among a plurality of nodes, based on one or more networking standards, including, for example, Internet Protocol (IP). Internet 330 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces.

Various devices and/or user identification information may be utilized during network access and/or communications, which may be structured, allocated, and/or assigned based on the specific wired and/or wireless protocols that are used to facilitate any such network access and/or communication. For example, in GSM and/or WCDMA based networks, International Mobile Equipment Identity (IMEI) parameters may be utilized to uniquely identify mobiles devices, and these IMEI parameters may also be used and/or traced back to the mobile devices' users. Service providers may utilize the device and/or user identification information to track mobile devices and/or users. The service providers may track devices and/or users for various reasons, including, for example, billing or usage monitoring, and/or to help locate mobile devices, and/or their users, in cases of emergency and/or law enforcement purposes. Tracking of devices may also be used to provide authorized LBS and/or real-time device location information which can be utilized to effectuate media content presentation on an interactive media wall in accordance with various embodiments.

As described above, a user device may be an identification device, such as a wearable NFC ID band. Although not limited to embodiments that utilize an identification device (as a mobile phone, for example, can be used to identify a user), a profile can be associated with the identification device. The profile may be stored locally on the identification device (e.g., smartphone) or stored at a network server. Upon a user engaging with an interactive media wall, such as media wall 108 of FIG. 1, the user can be identified via the identification device, and his/her profile can be obtained from, e.g., a cloud server, or similar network entity. The profile can be used to identify, e.g., a virtual themed helper, to appear on media wall 108 that can assist or otherwise engage the user via media wall 108. In other words, one or more visual or presentation-related elements for reinforcing a theme associated with a profile can be presented. For example, amusement parks with associated hotels can maintain a profile for a user staying at the hotel and visiting the amusement part. If a child wearing an identification band approaches media wall 108, the child's favorite movie character (specified in the child's profile) can appear on media wall 108 and can engage the child. Profiles can also be associated with each other such that siblings of the child can also be identified allowing their respective virtual themed helpers to interact on media wall 108. Alternatively or additionally, virtual themed helpers can be identified upon their appearance on media wall 108, allowing those virtual themed helpers to interact and/or engage their associated users as a group. For example, virtual themed helpers can be different characters in a children's movie.

Further still, profiles can be used to monitor the presentation of media content, such that a user may consume media content on a first device. Upon nearing When a user approaches media wall 108, the user can be identified using any one or more of the above-mentioned methods of identification, and the media content can resume on media wall 108 from the same point at which the user stopped consuming the media content on another device. As alluded to previously, DRM considerations may be taken into account when presenting media content on media wall 108 so as not to run afoul of any paid/subscription-based limitations on purchased or rented media content.

Continuing with the amusement park/resort example, media wall 108 can be used an informational kiosk or display, such that users can interact with media wall 108 in order to obtain maps, directions to certain attractions, ride wait times or restrictions, information about various parts or locations of the amusement park/resort, promotional media, etc. The multi-viewer aspect of various embodiments can be useful to other patrons who may be interested in visiting or obtaining information regarding, e.g., the same attraction that another patron is interested in. Still other environments in which media wall 108 can be used may include, but are not limited to convention centers, shopping malls, hotels, etc.

FIG. 4 is an operational flow chart illustrating example processes for displaying multiple media contents on an interactive media wall in accordance with various embodiments. At operation 400, it is determined whether a first user is proximate to the interactive media wall, i.e., within a certain range, such as 10-20 feet, and desires to interact with the interactive media wall. At operation 402, upon a determination that the first user desires to interact with the interactive media wall, a visual portion of first media content is displayed on the interactive media wall. A menu of media content may be displayed on the media wall or on the user's mobile device. It should be noted that an audio portion of the first media content may be provided via a peripheral listening device associated with the first user, via a speaker(s) associated with the interactive media wall, etc. At operation 404, it is determined whether a second user is proximate to the interactive media wall and desires to interact with the interactive media wall. At operation 406, upon a determination that the second user desires to interact with the interactive media wall, a visual portion of second media content is displayed on the interactive media wall simultaneously with the visual portion of the first media content. An audio portion of the second media content may be provided via a peripheral listening device associated with the second user, via a speaker(s) associated with the interactive media wall, etc.

Figure 5:
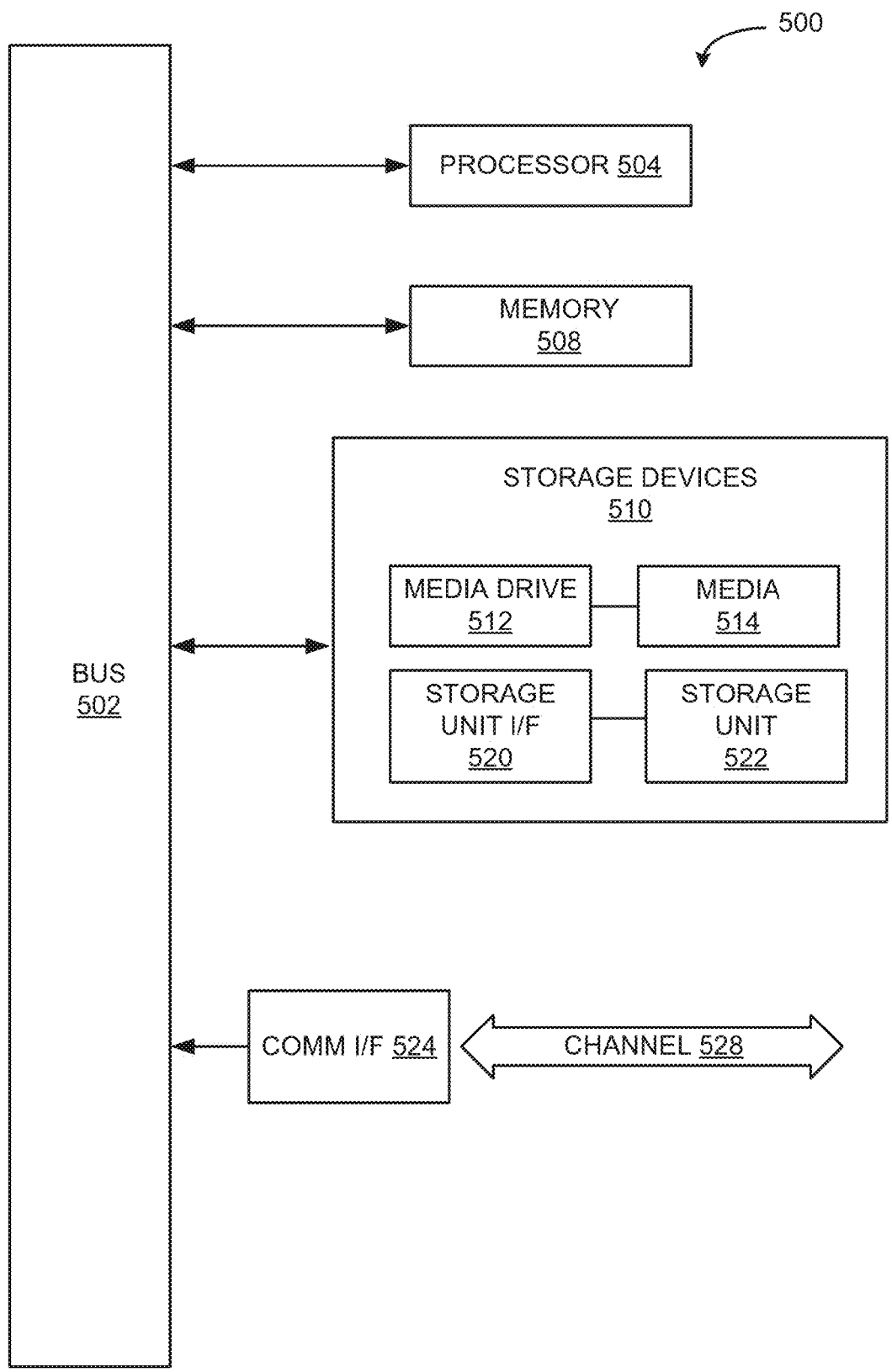
FIG. 5 is an example computing module that may be used to implement various features of embodiments described in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5 which may be used to implement various features of the system and methods disclosed herein. Various embodiments are described in terms of this example-computing module 500. After reading this description, it will become apparent to a person skilled in the relevant art how to implement the application using other computing modules or architectures.

Referring now to FIG. 5, computing module 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. For example, computing module 500 may be one embodiment of user device 102A, 102B, 102C, media wall 108, and/or one or more functional elements thereof. Computing module 500 might also represent computing capabilities embedded within or otherwise available to a given device. For example, a computing module might be found in other electronic devices such as, for example navigation systems, portable computing devices, and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for displaying multiple media contents on an interactive media wall, comprising:
   receiving a first media content from a media server;
   displaying the first media content on the interactive media wall;
   receiving a request from a first device of a first user to receive a first audio stream of the first media content;
   providing the first audio stream of the first media content to the first device; and
   providing a chat session associated with the first media content for the first user and additional users viewing the first media content and listening to the first audio stream of the first media content to communicate.

2. The computer-implemented method of claim 1, further comprising:
   determining whether the first user is proximate to the interactive media wall by determining the presence of the first user via a sensor co-located with the interactive media wall; and
   providing a menu on the first device of the user to select between the first audio stream of the first media content and a second audio stream of the second media content.

3. The computer-implemented method of claim 1, further comprising:
   receiving a second media content from the media server;
   displaying the second media content on the interactive media wall simultaneously with the first media content;
   receiving a request from a second device of a second user to receive a second audio stream of the second media content; and
   providing the second audio stream of the second media content to the second device of the second user.

4. The computer-implemented method of claim 3, further comprising displaying the first and second media content in first and second portals, respectively.

5. The computer-implemented method of claim 4, further comprising changing at least one of size and positioning of the first and second portals relative to each other based on a first number of additional users viewing the first media content and listening to the first audio stream of the first media content relative to a second number of additional users viewing the second media content and listening to the second audio stream of the second media content.

6. The computer-implemented method of claim 4, further comprising displaying visual indicia on the interactive media wall associated with at least the first user and a second user.

7. The computer-implemented method of claim 4, further comprising determining at least one of size and positioning of the first portal based upon metadata from the first media content.

8. The computer-implemented method of claim 1, further comprising accessing a first profile associated with the first user to identify a third media content to display on the interactive media wall.

9. The computer-implemented method of claim 8, wherein the first profile identifies one or more presentation preferences associated with the displaying of the third media content.

10. The computer-implemented method of claim 9, wherein the one or more presentation preferences comprise an indication of a version of the third media content.

11. The computer-implemented method of claim 9, wherein the one or more presentation preferences comprise an indication of a thematic aspect of the first media content.

12. The computer-implemented method of claim 11, further comprising displaying the first media content with one or more reinforcing elements commensurate with the thematic aspect.

13. The computer-implemented method of claim 1, further comprising:
receiving a request from a user to display a third media content on the interactive media wall;
determining that the third media content has digital rights;
retrieving an ad-supported version of the third media content from the media server; and
displaying the ad-supported version of the third media content.

14. The computer-implemented method of claim 13, wherein the displaying of the ad-supported version of the third media content occurs pursuant to a transition from displaying the third media content on the first user device associated with the first user to the displaying of the third media content on the interactive media wall.

15. The computer-implemented method of claim 13, further comprising displaying the chat session on the interactive media wall.

16. An interactive media wall, comprising:
a display of the interactive media wall configured to simultaneously display multiple media contents to be viewed by multiple users; and
a communication module configured to simultaneously provide multiple audio streams to multiple devices of the multiple users to listen to the multiple media contents, the multiple audio streams corresponding to respective ones of the multiple media contents;
wherein the display comprises multiple display areas, each of which display one of the multiple media contents, and wherein a position of each of the multiple display areas is determined based upon at least one characteristic of each of the media contents.

17. The interactive media wall of claim 16, further comprising a first chat area on the display through which a first subset of the multiple viewers viewing the same media content communicate.

18. The interactive media wall of claim 16, further comprising at least one sensor configured to determine a position of a user device relative to the interactive media wall receiving an audio stream associated with a media content displayed on the interactive media wall wherein the display further positions a media content based on the position of the user device.

19. The interactive media wall of claim 16, further comprising at least one communications module configured to communicate with at least one media server configured to control simultaneous display of the multiple media contents.

20. The interactive media wall of claim 16, wherein the at least one characteristic of each of the media contents comprises an age-based thematic aspect of each of the media contents.

* * * * *